US010300575B2

(12) United States Patent
Hosokai et al.

(10) Patent No.: US 10,300,575 B2
(45) Date of Patent: May 28, 2019

(54) BALL SCREW POLISHING METHOD AND DEVICE THEREOF

(71) Applicant: SANSHIN CO., LTD., Nagaoka-shi, Niigata (JP)

(72) Inventors: Nobukazu Hosokai, Nagaoka (JP); Takayuki Adachi, Nagaoka (JP)

(73) Assignee: SANSHIN CO., LTD., Nagaoka-Shi, Niigata (JP)

( * ) Notice: Subject to any disclaimer, the term of this patent is extended or adjusted under 35 U.S.C. 154(b) by 100 days.

(21) Appl. No.: 15/681,471

(22) Filed: Aug. 21, 2017

(65) Prior Publication Data

US 2018/0056472 A1   Mar. 1, 2018

(30) Foreign Application Priority Data

Aug. 23, 2016 (JP) ................. 2016-163052

(51) Int. Cl.

| B24B 21/16 | (2006.01) |
| B23G 9/00 | (2006.01) |
| B24B 19/02 | (2006.01) |
| B24B 29/02 | (2006.01) |
| B23G 1/36 | (2006.01) |
| B24B 21/00 | (2006.01) |
| F16H 25/24 | (2006.01) |
| F16H 25/22 | (2006.01) |

(52) U.S. Cl.

CPC ............... *B24B 21/16* (2013.01); *B23G 1/36* (2013.01); *B23G 9/004* (2013.01); *B24B 19/022* (2013.01); *B24B 21/004* (2013.01); *B24B 29/02* (2013.01); *F16H 25/2204* (2013.01); *F16H 25/24* (2013.01); *F16H 2025/2481* (2013.01)

(58) Field of Classification Search

CPC ......... B24B 21/16; B24B 29/02; B24B 19/02; B24B 19/022; B23G 19/004
USPC ...................... 451/5, 8, 9, 10, 11, 47, 48, 59
See application file for complete search history.

(56) References Cited

U.S. PATENT DOCUMENTS

| 3,461,614 | A | * | 8/1969 | Neubarth | ................. B23F 5/08 451/147 |
| 4,643,041 | A | | 2/1987 | Benton | |
| 5,951,377 | A | * | 9/1999 | Vaughn | .................... B24B 5/42 451/14 |
| 6,253,453 | B1 | | 7/2001 | Tsukada | |

(Continued)

FOREIGN PATENT DOCUMENTS

JP     2015-61734 A     4/2015

*Primary Examiner* — Robert Rose
(74) *Attorney, Agent, or Firm* — Bacon & Thomas, PLLC

(57) ABSTRACT

The invention has a turnback roll which can transfer and guide a polishing tap in a tangential direction of a pressure contacting roll, a vertical oscillation mechanism which linearly oscillates the pressure contacting roll in a tangential direction of a ball groove while being orthogonal to a rotating axis line, and a horizontal oscillation mechanism which linearly oscillates the pressure contacting roll in a direction of a rotating axis line toward both inner side surfaces of the ball groove. The ball groove can be securely polished by the polishing tape on the basis of the continuous or intermittent transfer of the polishing tape and the linear oscillating motion of the ball groove. It is possible to improve a polishing precision, it is possible to improve a surface roughness of the ball groove and it is possible to improve a polishing workability of the ball groove.

5 Claims, 12 Drawing Sheets

(56) References Cited

U.S. PATENT DOCUMENTS

| | | | |
|---|---|---|---|
| 6,334,370 B1 | 1/2002 | Sonoda et al. |
| 2004/0053563 A1 | 3/2004 | Kajita |
| 2005/0016308 A1 | 1/2005 | Hayashi |
| 2005/0079042 A1 | 4/2005 | Maeda |
| 2006/0121833 A1 | 6/2006 | Kajita |
| 2007/0209465 A1 | 9/2007 | Shirai et al. |
| 2009/0084212 A1 | 4/2009 | Niwa et al. |
| 2009/0301246 A1 | 12/2009 | Yoshida et al. |
| 2010/0043582 A1 | 2/2010 | Tateishi et al. |
| 2010/0101347 A1 | 4/2010 | Uesugi et al. |
| 2010/0101348 A1 | 4/2010 | Teramachi et al. |
| 2012/0325036 A1 | 12/2012 | Harada et al. |
| 2013/0008275 A1 | 1/2013 | Watanabe et al. |
| 2015/0283600 A1 | 10/2015 | Harada et al. |
| 2016/0039024 A1 | 2/2016 | Haruta |
| 2016/0169356 A1 | 6/2016 | Tateishi et al. |

* cited by examiner

BALL SCREW POLISHING METHOD AND DEVICE THEREOF

BACKGROUND OF THE INVENTION

Field of the Invention

The present invention relates to a ball screw polishing method which is used when polishing a ball groove of a screw shaft in a ball screw with a polishing tape, and a device thereof.

Description of the Conventional Art

Conventionally, as this kind of ball screw polishing device, there has been known a structure having a retention mechanism which rotatably retains a screw shaft of a ball screw, a rotary mechanism which rotates the screw shaft around an axis line, a taper transfer mechanism which continuously or intermittently transfers a polishing tape, a tape pressure contacting mechanism which brings the polishing tape into pressure contact with a ball groove of the screw shaft on an outer peripheral surface of the pressure contacting roll, an inclination mechanism which arranges a rotating axis line of the pressure contacting roll so as to incline in correspondence to a lead angle of the ball groove, a tape moving mechanism which moves the polishing tape in a direction of the axis line of the screw shaft, and a speed synchronizing means which synchronizes a rotating speed of the screw shaft and a moving speed of the polishing tape in correspondence to the lead of the ball groove.

Accordingly, the screw shaft of the ball screw is rotatably retained by the retention mechanism, the screw shaft is rotated around the axis line by the rotary mechanism, the polishing tape is continuously or intermittently transferred by the tape transfer mechanism, the polishing tape is brought into pressure contact with the ball groove of the screw shaft on the outer peripheral surface of the pressure contacting roll by the tape pressure contacting mechanism, the rotating axis line of the pressure contacting roll is arranged so as to be inclined by the inclination mechanism in correspondence to the lead angle of the ball groove, the polishing tape is moved by the tape moving mechanism in the direction of the axis line of the screw shaft, the rotating speed of the screw shaft and the moving speed of the polishing tape are synchronized by the speed synchronizing means in correspondence to the lead of the ball groove, and the ball groove is polished by the polishing tape on the basis of a complex motion of the rotation of the screw shaft, the transfer of the polishing tape, and the movement of the polishing tape in synchronization with the rotating speed of the screw shaft.

PRIOR ART DOCUMENT

Patent Document

Patent Document 1: Japanese Unexamined Patent Publication No. 2015-61734

SUMMARY OF THE INVENTION

Problem to be Solved by the Invention

However, in the case of this conventional structure, the ball groove of the screw shaft in the ball screw has a disadvantage that the ball groove can not necessarily obtain a good surface roughness in spite of the ball groove being a groove in which the ball rolls.

Means for Solving the Problem

An object of the present invention is to solve the disadvantage as mentioned above. In the present invention, the invention of a method described in a first aspect of the present invention exists in a ball screw polishing method comprising the steps of:

rotatably retaining a screw shaft of a ball screw and rotating the screw shaft around an axis line when polishing the screw shaft by a polishing tape;

continuously or intermittently transferring the polishing tape;

bringing the polishing tape into pressure contact with a ball groove of the screw shaft on an outer peripheral surface of a pressure contacting roll;

wherein a rotating axis line of the pressure contacting roll is arranged so as to incline in correspondence to a lead angle of the ball groove, wherein the polishing tap is transferred and guided in a tangential direction of the pressure contacting roll by a turnback roll, linearly oscillating the pressure contacting roll in a tangential direction of the ball groove while being orthogonal to the rotating axis line;

linearly oscillating the pressure contacting roll in a direction of the rotating axis line toward both inner side surfaces of the ball groove;

moving the polishing tape to the direction of the axis line of the screw shaft;

synchronizing a rotating speed of the screw shaft and a moving speed of the polishing taper in correspondence to the lead of the ball groove; and polishing the ball groove by the polishing tape on the basis of a complex motion of the rotation of the screw shaft, the transfer of the polishing tape, the linear oscillating motion in two dictions including the tangential direction of the ball groove and the direction of the axis line toward both the inner side surfaces of the ball groove, and the movement of the polishing tape in synchronization with the rotating speed of the screw shaft.

Further, the invention of a device described in a second aspect exists in a ball screw polishing device comprising:

a retention mechanism which rotatably retains a screw shaft of a ball screw;

a rotary mechanism which rotates the screw shaft around an axis line;

a tape transfer mechanism which continuously or intermittently transfer a polishing tape;

a taper pressure contacting mechanism which brings the polishing tape into pressure contact with a ball groove of the screw shaft on an outer peripheral surface of a pressure contacting roll;

an inclination mechanism which arranges a rotating axis line of the pressure contacting roll so as to incline in correspondence to a lead angle of the ball groove;

a tape moving mechanism which moves the polishing tape in a direction of an axis line of the screw shaft; and a speed synchronizing means which synchronizes a rotating speed of the screw shaft and a moving speed of the polishing tape in correspondence to the lead of the ball groove, wherein the ball screw polishing device further comprises:

a turnback roll which is capable of transferring and guiding the polishing tape in a tangential direction of the pressure contacting roll;

a vertical oscillation mechanism which linearly oscillates the pressure contacting roll in a tangential direction of the ball groove while being orthogonal to the rotating axis line; and a horizontal oscillation mechanism which linearly oscillates the pressure contacting roll in a direction of aid rotating axis line toward both inner side surfaces of the ball groove.

Further, the invention of a device described in a third aspect is characterized in that the vertical oscillation mechanism is constructed by a vertical eccentric mechanism which linearly oscillates the pressure contacting roll in the tangential direction of the ball groove while being orthogonal to the rotating axis line, and the invention of a device described in a fourth aspect is characterized in that the horizontal oscillation mechanism is constructed by a horizontal eccentric mechanism which linearly oscillates the pressure contacting roll in the direction of the rotating axis line toward both the inner side surfaces of the ball groove.

Further, the invention of a device described in a fifth aspect is characterized in that the speed synchronizing means is constructed by a rotating control motor which rotates the screw shaft, a moving control motor which moves the polishing tape, and a synchronous control part which synchronously controls a rotating speed of the rotating control motor and a rotating speed of the moving control motor.

Effect of the Invention

The present invention is structured as mentioned above. According to the inventions described in the first aspect and the second aspect, the screw shaft of the ball screw is rotatably retained by the retention mechanism. The screw shaft is rotated around the axis line by the rotary mechanism. The polishing tape is transferred continuously or intermittently by the tape transfer mechanism. The polishing tape is brought into pressure contact with the screw shaft on the outer peripheral surface of the pressure contacting roll by the tape pressure contacting mechanism. The rotating axis line of the pressure contacting roll is arranged by the inclination mechanism so as to incline in correspondence to the lead angle of the ball groove. The polishing tape is transferred and guided in the tangential direction of the pressure contacting roll by the turnback roll. The pressure contacting roll is linearly oscillated by the vertical oscillation mechanism in the tangential direction of the ball groove while being orthogonal to the rotating axis line of the pressure contacting roll. Further, the pressure contacting roll is linearly oscillated by the horizontal oscillation mechanism in the direction of the rotating axis line toward both the inner side surfaces of the ball groove. The polishing tape is moved by the tape moving mechanism in the direction of the axis line of the screw shaft. The rotating speed of the screw shaft and the moving speed of the polishing tape are synchronized by the speed synchronizing means in correspondence to the lead of the ball groove. The ball groove can be polished by the polishing tape on the basis of the complex motion of the rotation of the screw shaft, the transfer of the polishing tape, the linear oscillating motion in two directions including the tangential direction of the ball groove and the direction of the rotating axis line toward both the inner side surfaces of the ball groove, and the movement of the polishing tape in synchronization with the rotating speed of the screw shaft. The polishing tape is moved in conformity to the lead of the ball groove on the basis of the movement of the polishing tape in synchronization with the rotating speed of the screw shaft, and the polishing tape is securely brought into pressure contact with the ball groove by the tape pressure contacting mechanism. The ball groove can be securely polished by the polishing tape on the basis of the continuous or intermittent transfer of the polishing tape and the linear oscillating motion in two directions including the tangential direction of the ball groove and the direction of the rotating axis line toward both the inner side surfaces of the ball groove. It is possible to improve a polishing precision, it is possible to improve a surface roughness of the ball groove and it is possible to improve a polishing workability of the ball groove.

Further, according to the invention described in the third aspect, the vertical oscillation mechanism mentioned above is constructed by the vertical eccentric mechanism which linearly oscillates the pressure contacting roll in the tangential direction of the ball groove while being orthogonal to the rotating axis line. As a result, it is possible to simplify the structure. Further, according to the invention described in the fourth aspect, the horizontal oscillation mechanism mentioned above is constructed by the horizontal eccentric mechanism which linearly oscillates the pressure contacting roll in the direction of the rotating axis line toward both the inner side surfaces of the ball groove. As a result, it is possible to simplify the structure.

Further, according to the invention described in the fifth aspect, the speed synchronizing means mentioned above is constructed by the rotating control motor which rotates the screw shaft, the moving control motor which moves the polishing tape, and the synchronous control part which synchronously controls the rotating speed of the rotating control motor and the rotating speed of the moving control motor. As a result, it is possible to synchronize the rotating speed of the screw shaft and the moving speed of the polishing tape in correspondence to the lead of the ball groove, it is possible to securely move in a contact manner the polishing tape in conformity to the lead of the ball groove, it is possible to simplify the structure and it is possible to improve the polishing precision.

DETAILED DESCRIPTION OF PREFERRED EMBODIMENT

Figure 1:
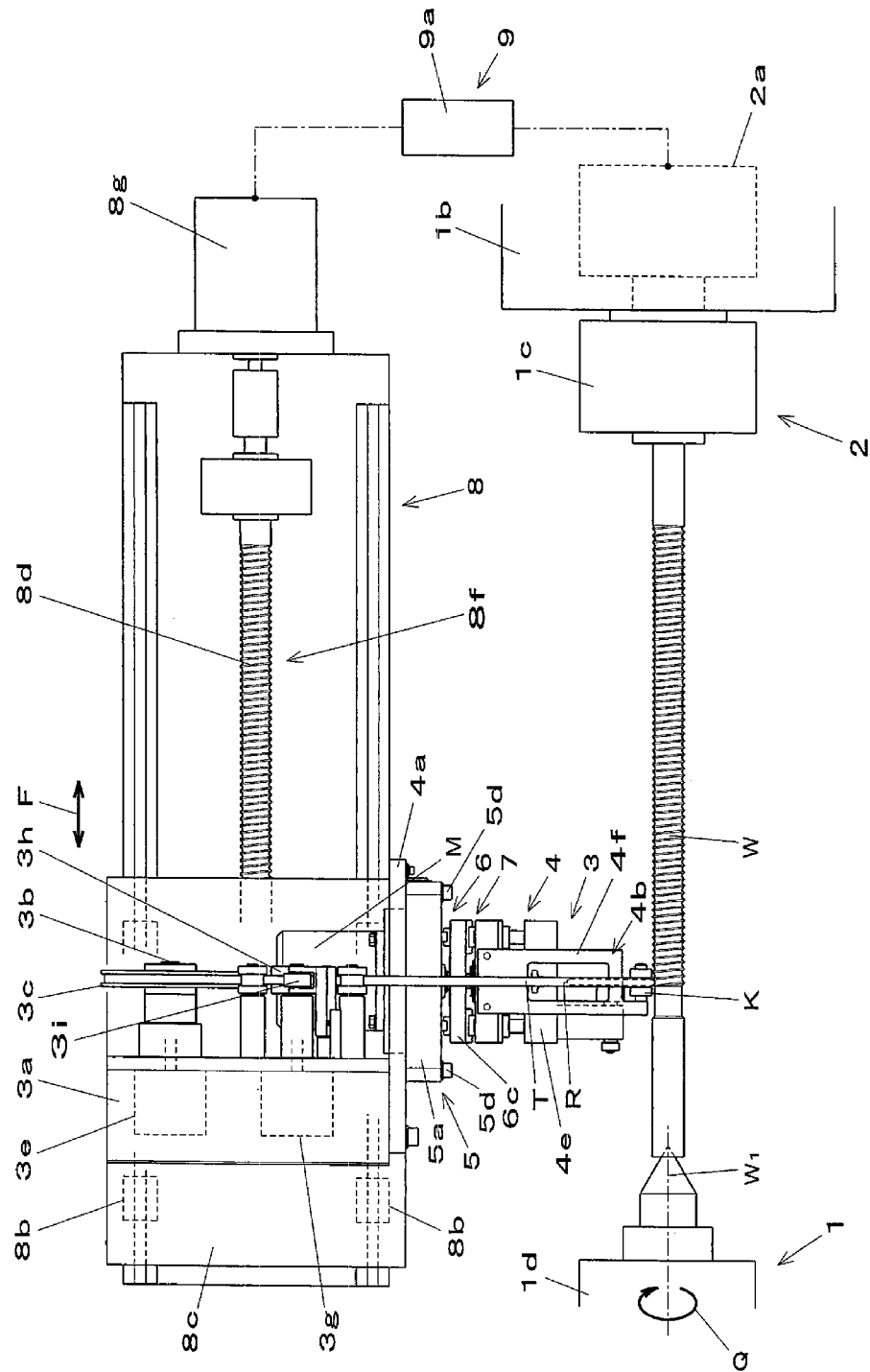
FIG. 1 is a plan view of a whole of an embodiment according to the present invention.

FIGS. 1 to 14 show an embodiment according to the present invention. In this case, roughly classifying, the embodiment is constructed, as shown in FIGS. 1, 2, 3, 4, 6 and 11, by a retention mechanism 1, a rotary mechanism 2, a tape transfer mechanism 3, a tape pressure contacting mechanism 4, an inclination mechanism 5, turnback rolls K and K, a vertical oscillation mechanism 6, a horizontal oscillation mechanism 7, a tape moving mechanism 8, and a speed synchronizing means 9. The retention mechanism 1 rotatably retains a screw shaft W of a ball screw. The rotary mechanism 2 rotates the screw shaft W around an axis line W1. The tape transfer mechanism 3 continuously or intermittently transfers a polishing tape T. The tape pressure contacting mechanism 4 brings the polishing tape T into pressure contact with a ball groove B of the screw shaft W on an outer peripheral surface of a pressure contacting roller R. The inclination mechanism 5 arranges a rotating axis line R1 of the pressure contacting roll R so as to incline in correspondence to a lead angle θ of the ball groove B. The turnback rolls K and K can transfer and guide the polishing tape T in a tangential direction of the pressure contacting roll R. The vertical oscillation mechanism 6 linearly oscillates Y the pressure contacting roll R in a tangential direction of the ball groove B while being orthogonal to the rotating axis line R1. The horizontal oscillation mechanism 7 linearly oscillates X the pressure contacting roll R in a direction of the rotating axis line R1 toward both inner side surfaces B1 and B1 of the ball groove B. The tape moving mechanism 8 moves the polishing tape T in a direction of an axis line W1 of the screw shaft W. The speed synchronizing means 9 synchronizes a rotating speed Q of the screw shaft W and a moving speed F of the polishing tape T in correspondence to a lead L of the ball groove B (a distance that a nut proceeds in an axial direction when the screw shaft W goes into a 360-degree roll).

Figure 2:
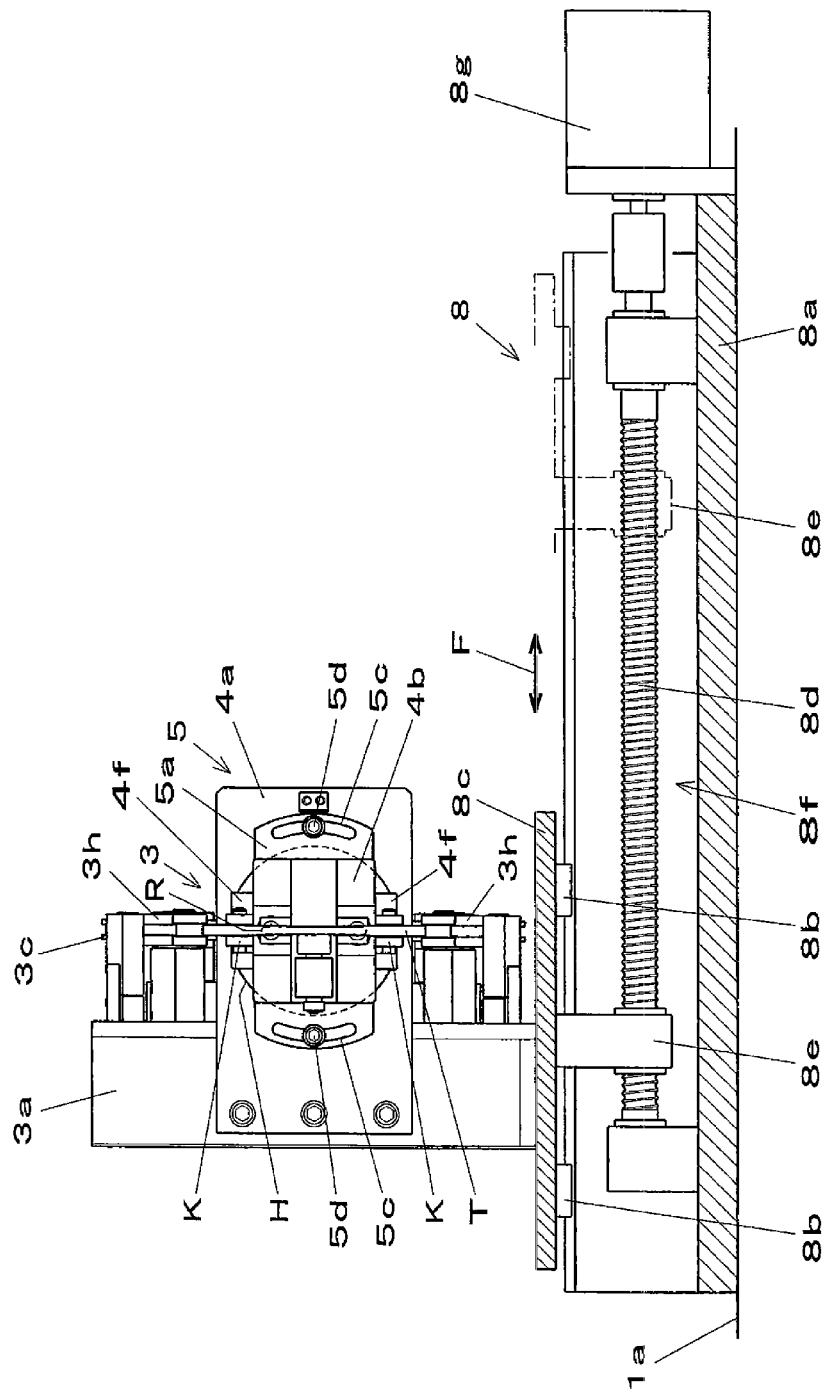
FIG. 2 is a front cross sectional view of the embodiment according to the present invention.

In this case, the retention mechanism 1 and the rotary mechanism 2 are structured, as shown in FIGS. 1 and 2, such that a retention table 1b is provided in a rising manner in a machine body 1a, a chuck 1c which can detachably retain one end portion of the screw shaft w of the ball screw is arranged in the retention table 1b, a center core pressing table 1d which can rotationally retains the other end portion of the screw shaft W is arranged in the retention table 1b, and the screw shaft W is rotated by rotating the chuck 1c by a rotating control motor 2a.

In this case, the tape transfer mechanism 3 is structured as shown in FIGS. 1, 2, 3, 4, 5 and 6. More specifically, in the tape transfer mechanism 3, a full winding reel 3c which winds the unused polishing tape T with a pair of support shafts 3b and 3b and an empty reel 3d are rotationally arranged on a mounting base table 3a. The polishing tape T unwound from the full winding reel 3c is wound around the empty reel 3d via the outer peripheral surface of the pressure contacting roll R in the tape pressure contacting mechanism 4. The pressure contacting roll R is formed in this case by coating an elastic material G such as rubber on an outer peripheral surface of a shaft member D made of metal. The full winding reel 3c is rotated in an unwinding manner by an unwinding motor 3e, and the empty reel 3d is rotated in a winding manner by a winding motor 3f. Transfer rolls 3h and 3h rotated in a feeding manner by transferring motors 3g and 3g and pinching rolls 3i and 3i are arranged between the full winding reel 3c and the pressure contacting roll R, and between the pressure contacting roll R and the empty reel 3d. As a result, the polishing tape T is continuously or intermittently transferred T1 at a comparatively low speed from the full winding reel 3c to the empty reel 3d via the pressure contacting roll R on the basis of cooperation of the unwinding motor 3e, the winding motor 3f and the transferring motors 3g and 3g.

Figure 4:
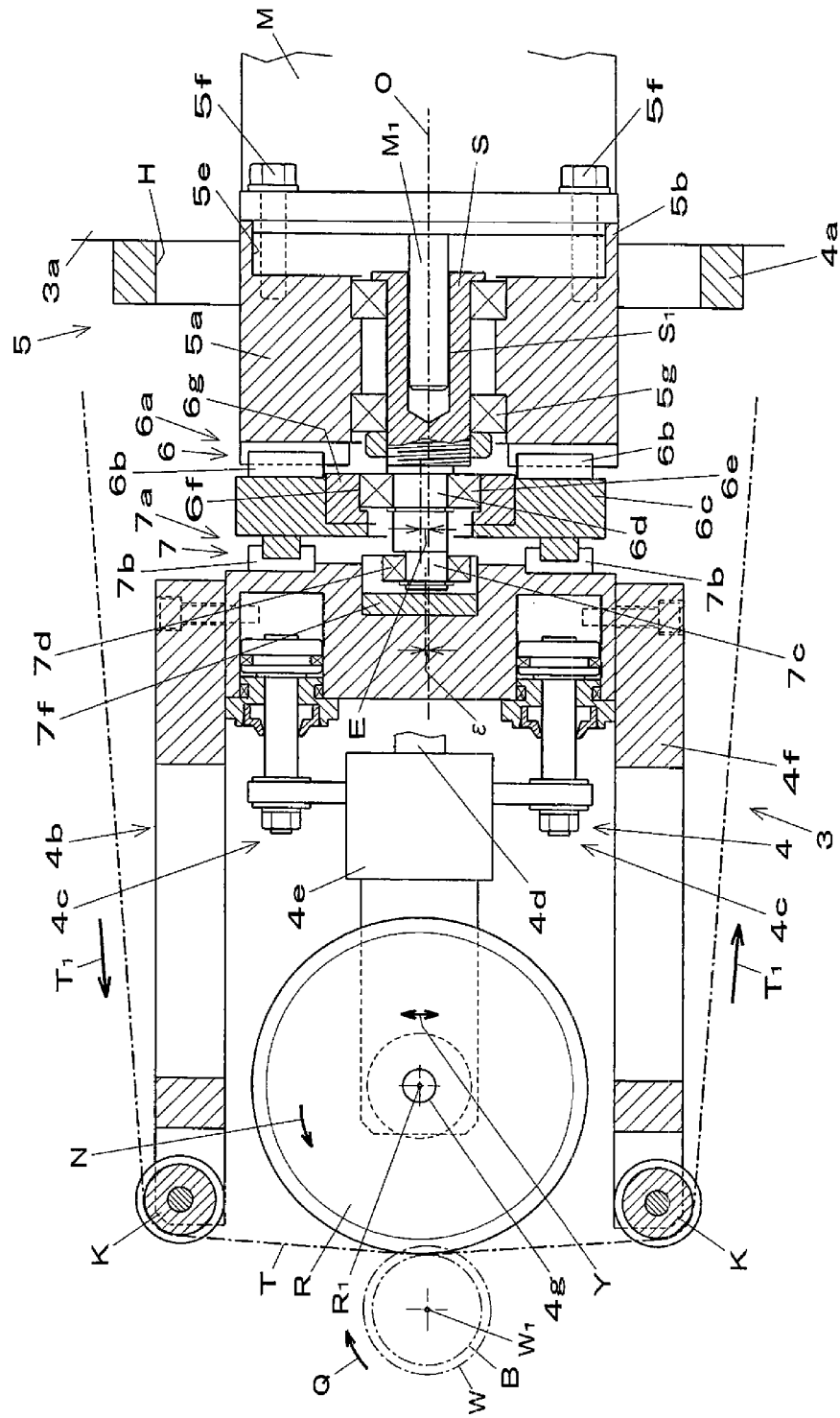
FIG. 4 is a partly enlarged side cross sectional view of the embodiment according to the present invention.
Figure 5:
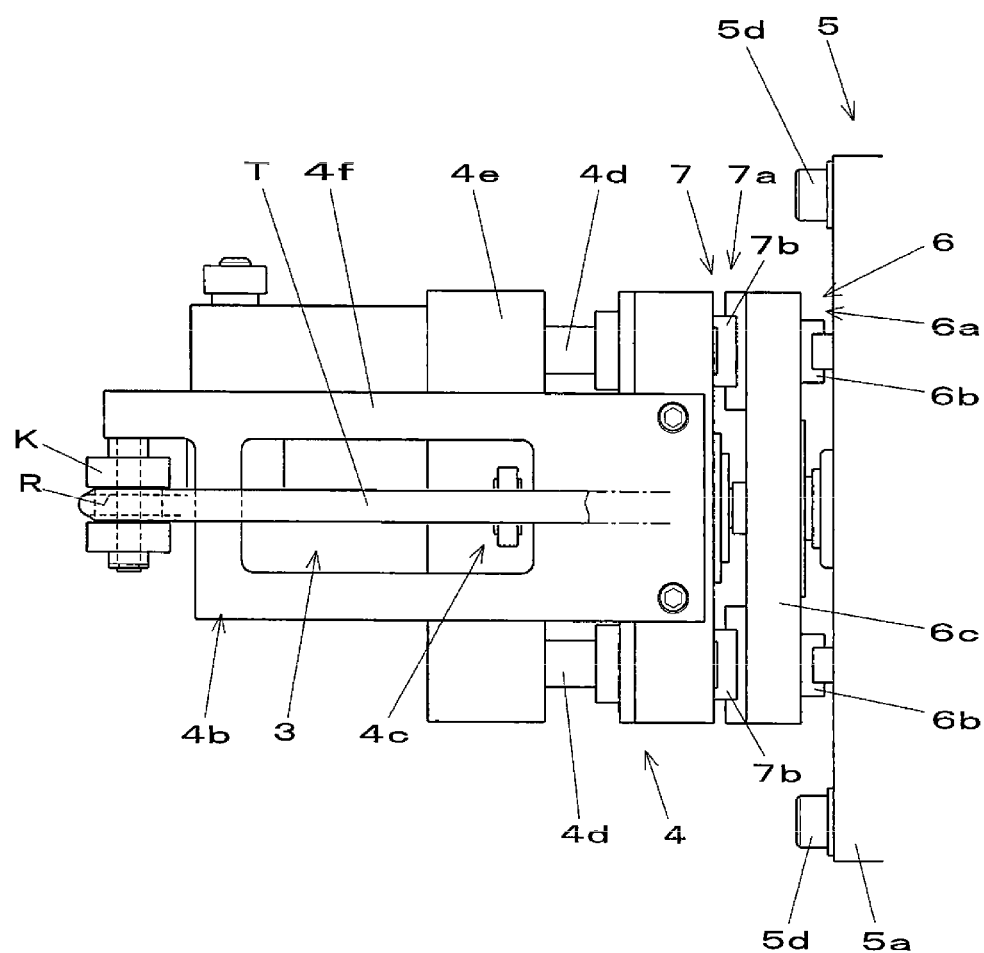
FIG. 5 is a partly enlarged plan view of the embodiment according to the present invention.
Figure 6:
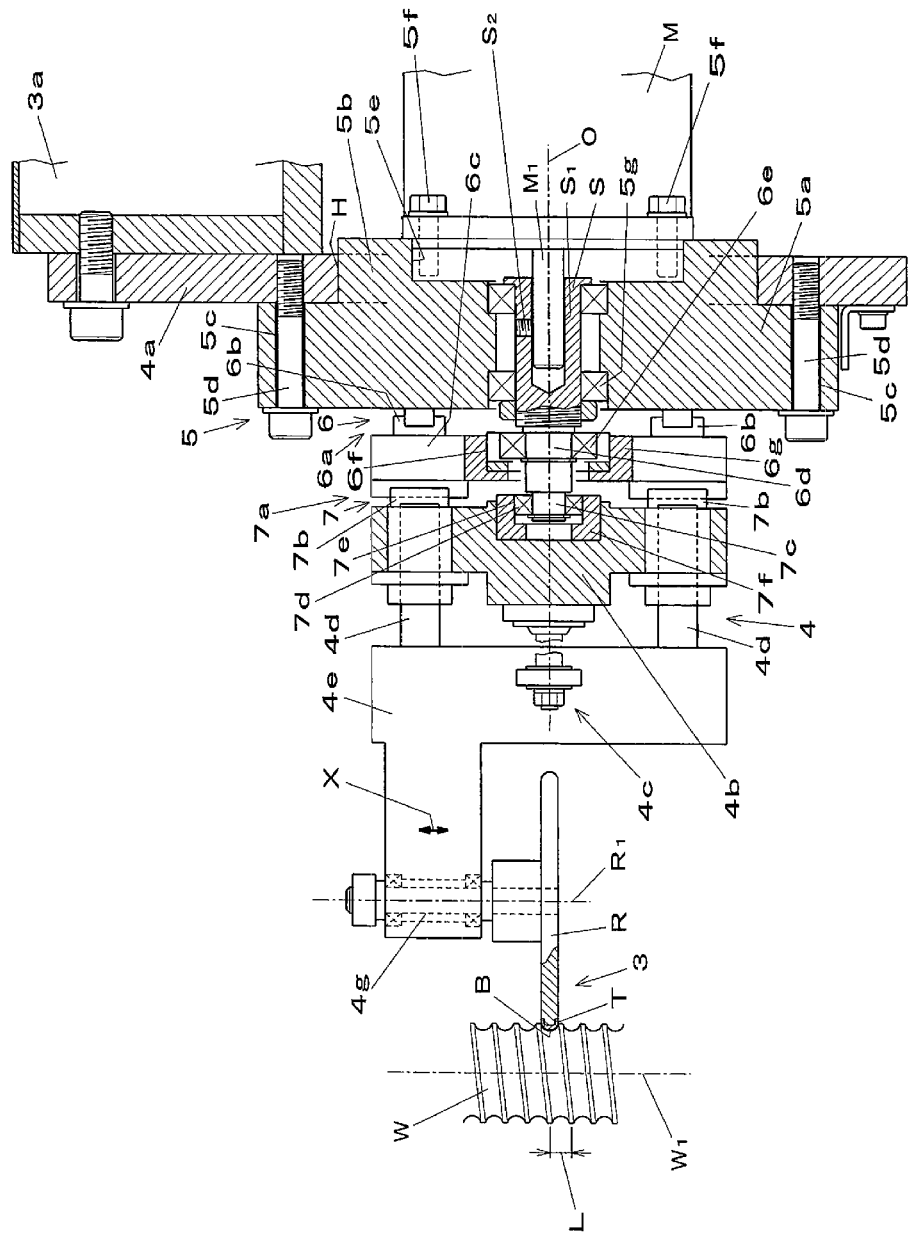
FIG. 6 is a partly enlarged plan cross sectional view of the embodiment according to the present invention.
Figure 7:
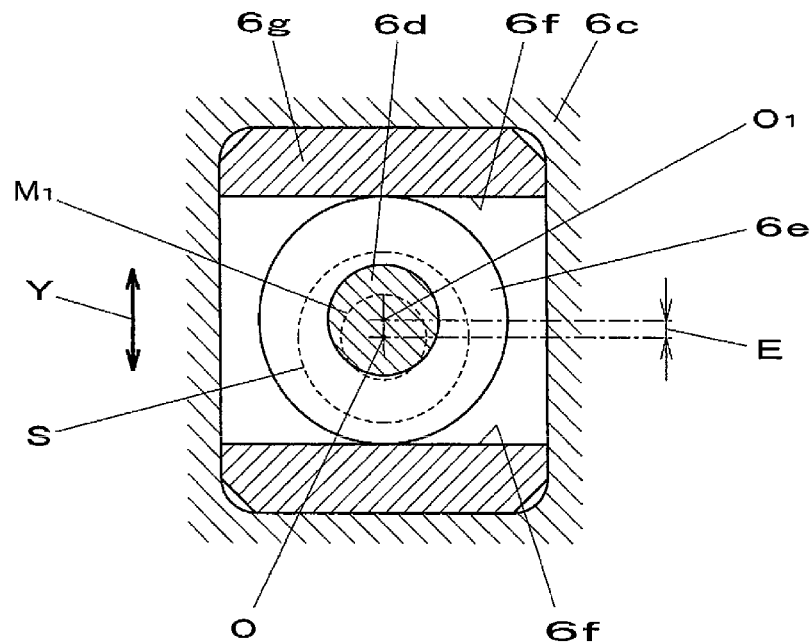
FIG. 7 is a partly enlarged front cross sectional view of the embodiment according to the present invention.
Figure 8:
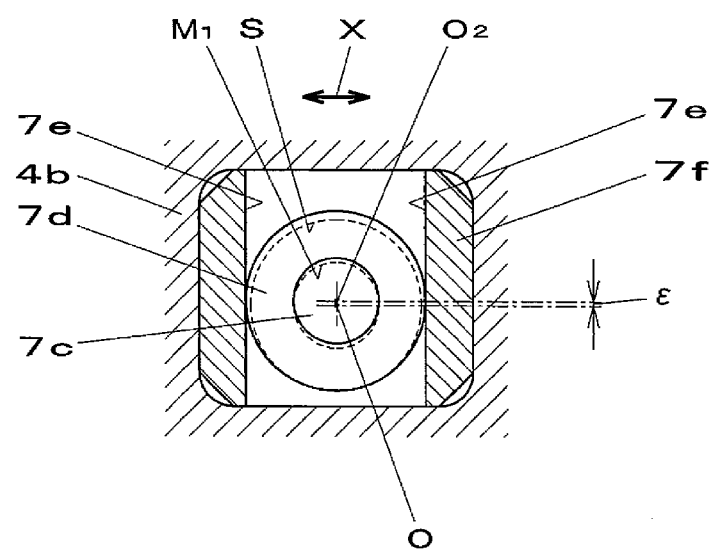
FIG. 8 is a partly enlarged front cross sectional view of the embodiment according to the present invention.
Figure 9:
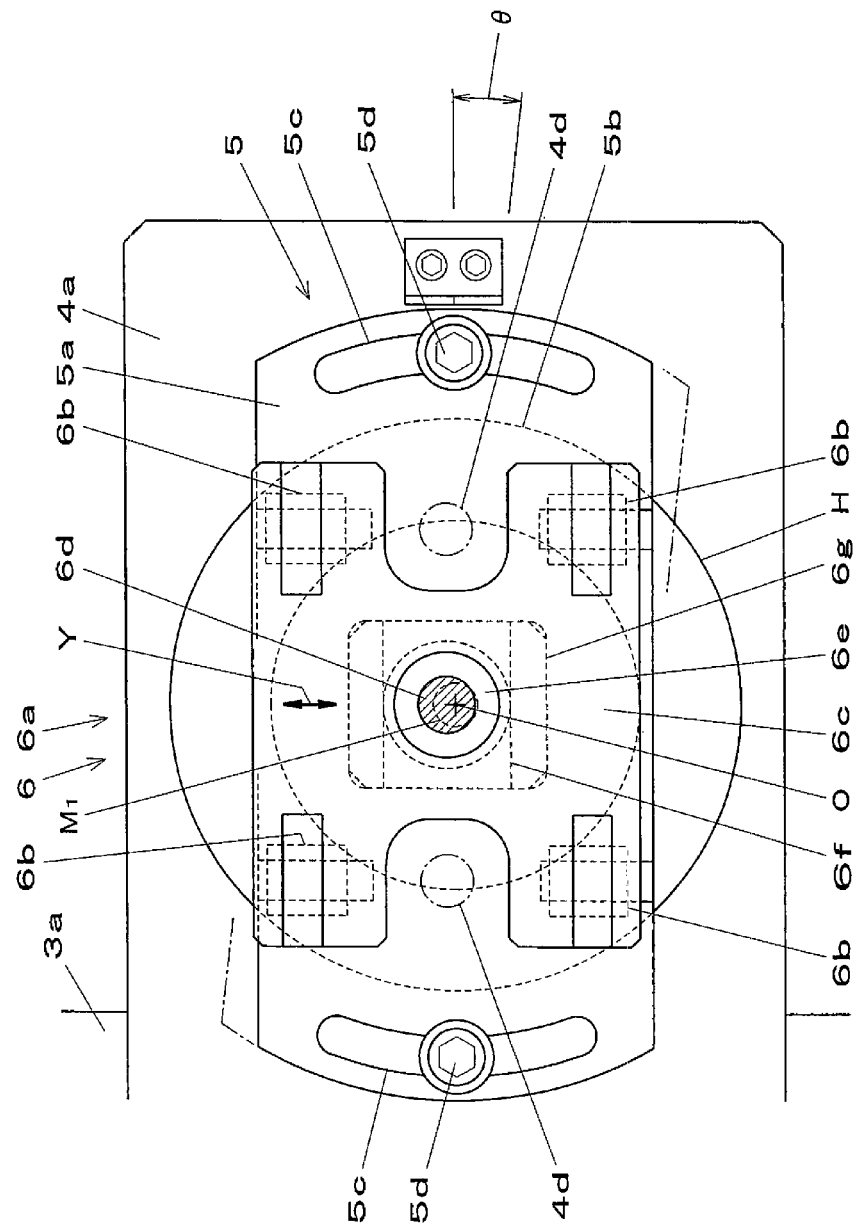
FIG. 9 is a partly enlarged front cross sectional view of the embodiment according to the present invention.
Figure 10:
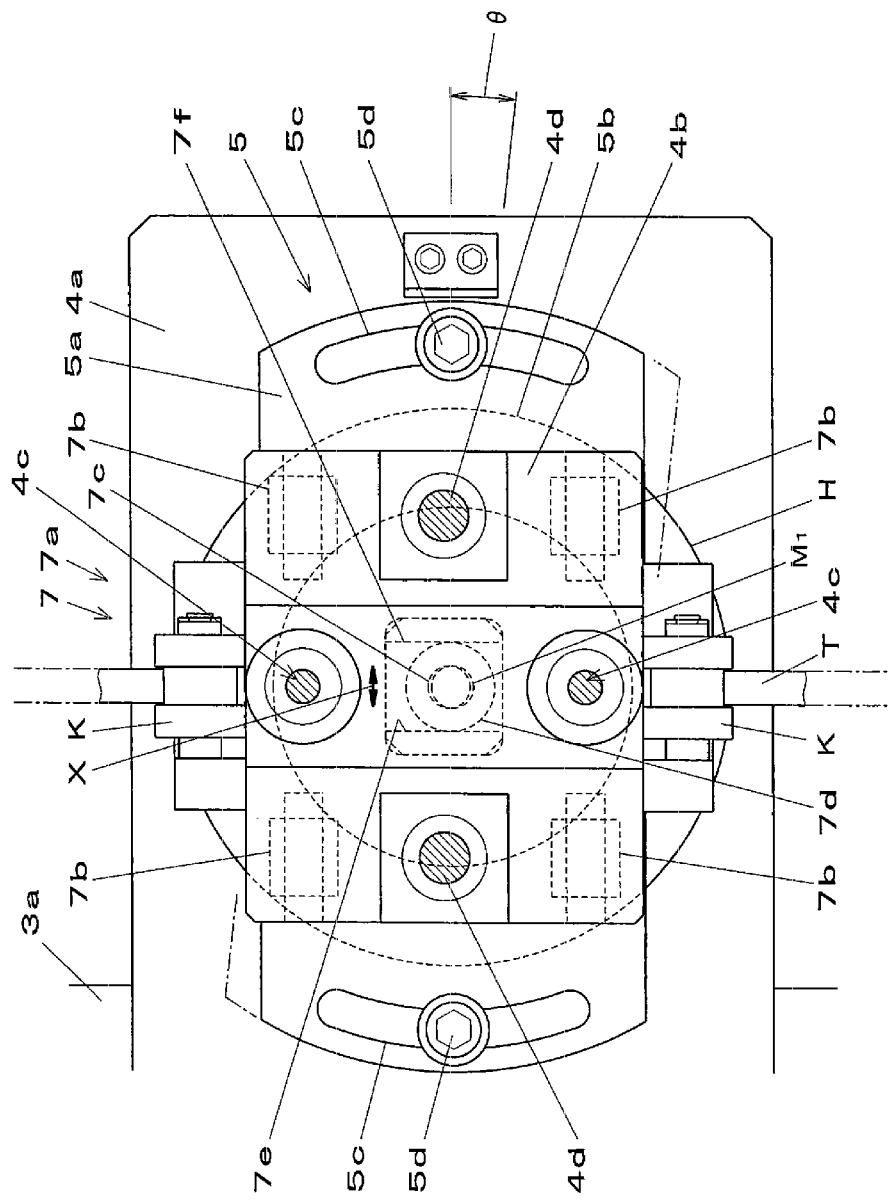
FIG. 10 is a partly enlarged front cross sectional view of the embodiment according to the present invention.
Figure 11:
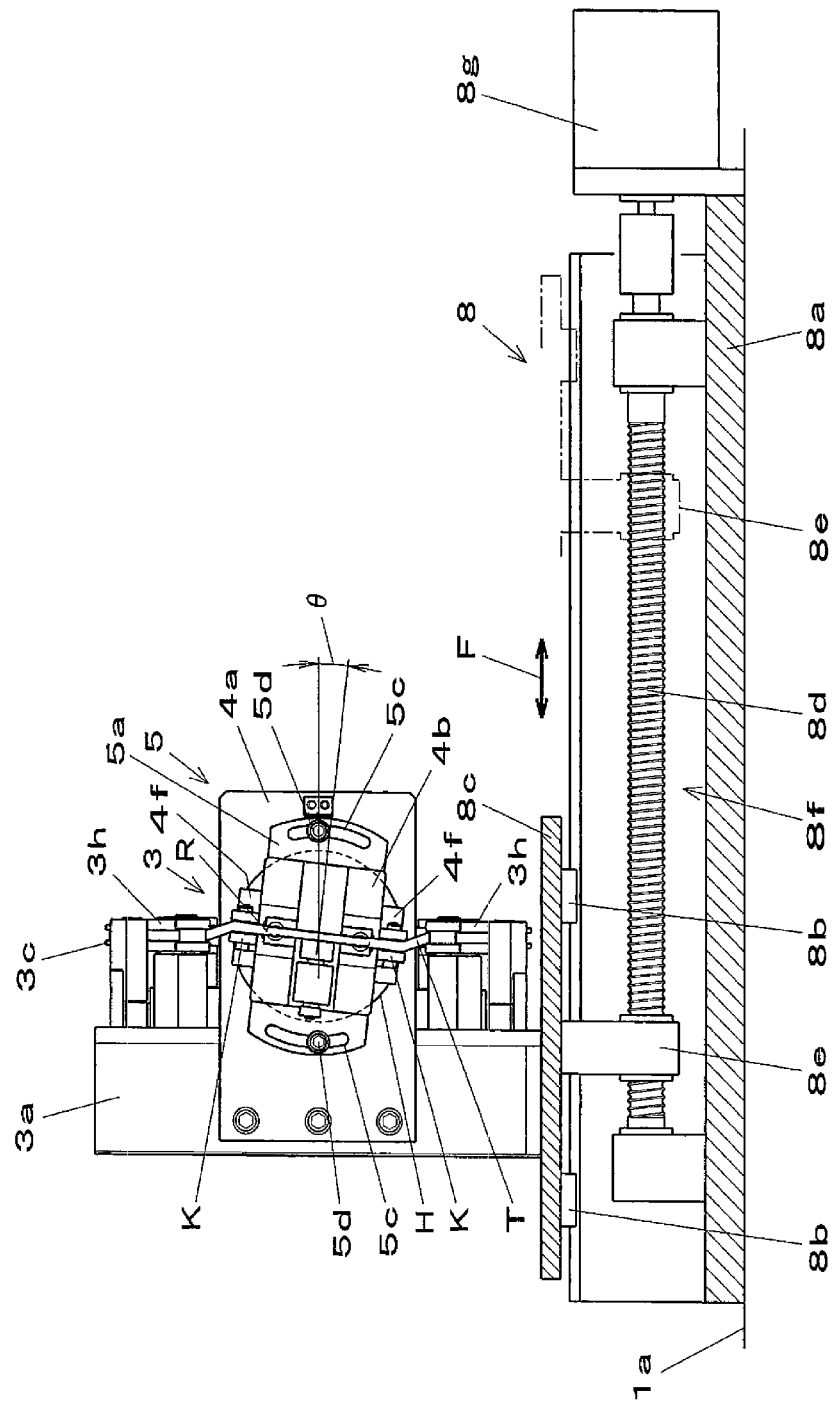
FIG. 11 is a front cross sectional view of an operating state of the embodiment according to the present invention.
Figure 12:
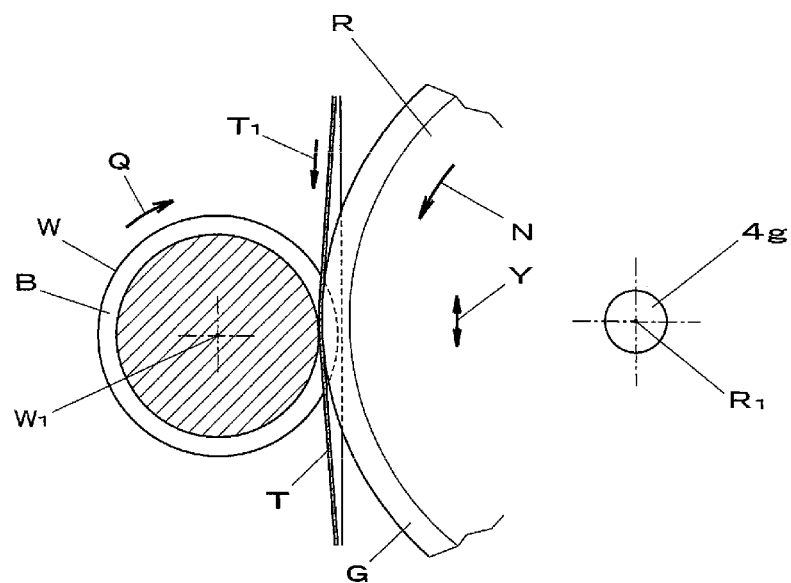
FIG. 12 is a partly explanatory side cross sectional view of the embodiment according to the present invention.
Figure 13:
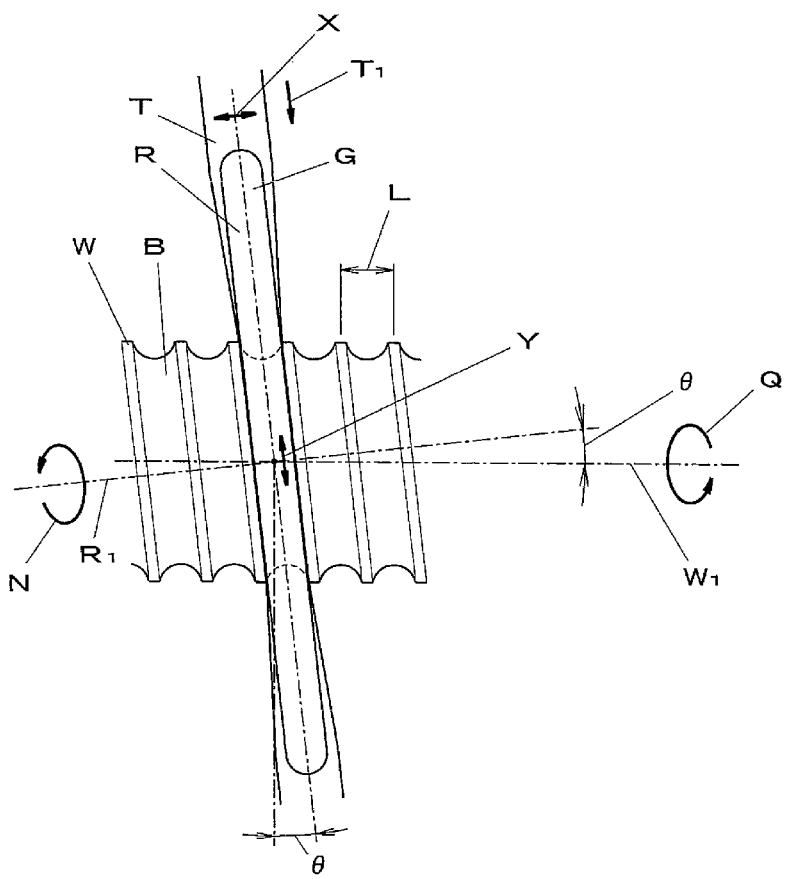
FIG. 13 is a partly explanatory back elevational view of the embodiment according to the present invention.
Figure 14:
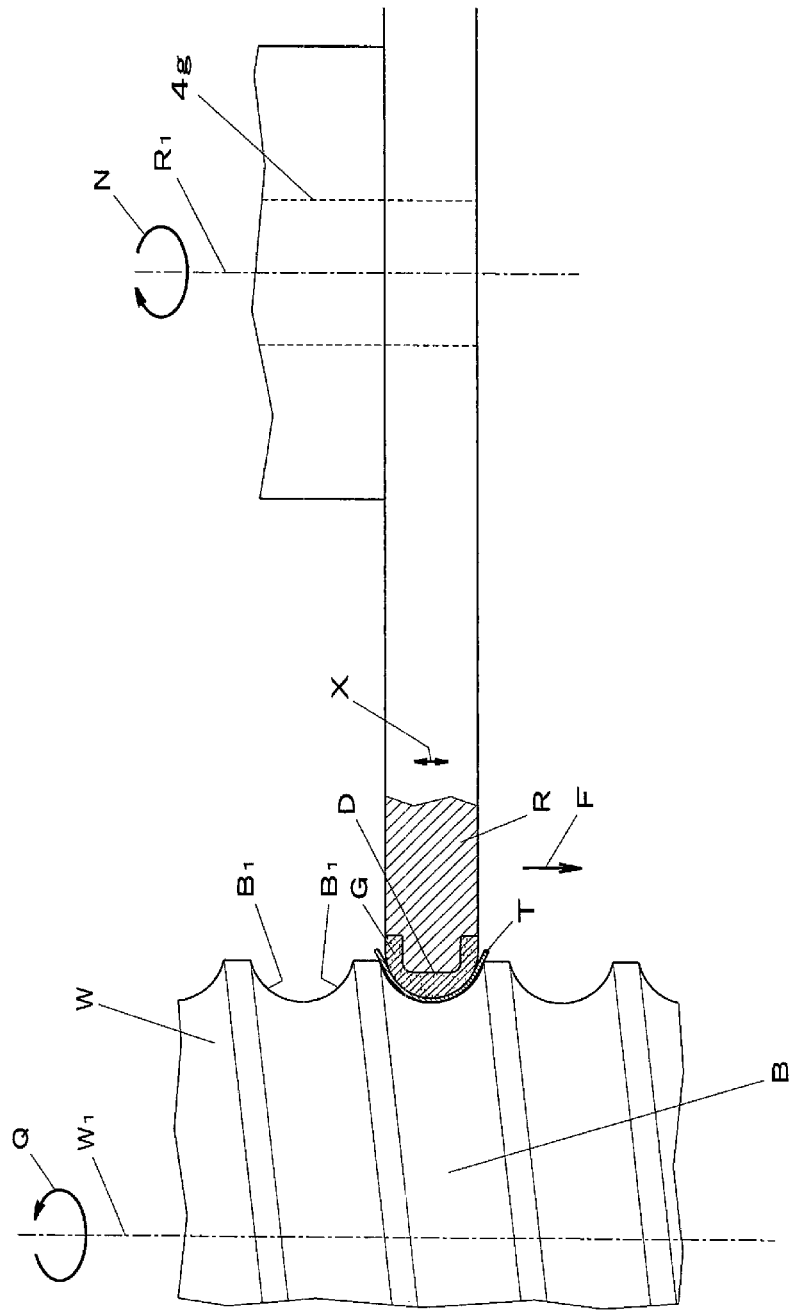
FIG. 14 is a partly explanatory plan cross sectional view of the embodiment according to the present invention.

Further, in this case, the tape pressure contacting mechanism 4 is structured as shown in FIGS. 4, 5 and 6. More specifically, in the tape pressure contacting mechanism 4, a mounting member 4a is provided in a rising manner on a front surface of the mounting base table 3a. A pressure contact base body 3b is arranged in the mounting member 4a via the inclination mechanism 5, the vertical oscillation mechanism 6 and the horizontal oscillation mechanism 7. A forward and backward moving member 4e constructed by a bifurcated member 4f is arranged in a pressure contacting base body 4b by a pair of right and left cylinder mechanisms 4c and 4c and guide shafts 4d and 4d which are formed orthogonal thereto. A pair of right and left turnback rolls K and K are provided in the pressure contacting base body 4b, a guide shaft 4g is horizontally provided rotatably in a cantilever state in the forward and backward moving member 4e. The pressure contacting roll R is arranged in a leading end portion of the guide shaft 4g in a state in which a rotating axis line R1 is approximately horizontal. The pressure contacting roll R is rotated N in a driven manner by the transfer T1 of the polishing tape T. The polishing tape T is transferred and guided in a tangential direction of the outer peripheral surface of the pressure contacting roll R by the turnback rolls K and K, and the polishing tape T between the turnback rolls K and K is brought into pressure contact with the ball groove B of the screw shaft W on the outer peripheral surface of the pressure contacting roll R by the cylinder mechanism 4c and 4c.

In this case, the polishing tape T is constructed by coating or coupling polishing particles having a predetermined particle size such as aluminum oxide, chrome oxide, silicon carbide and diamond to a base material such as polyester film, metal and cloth.

Further, the inclination mechanism 5 is structured as shown in FIGS. 4, 5, 6, 9 and 10. More specifically, in the inclination mechanism 5, a turning member 5a is arranged in the mounting member 4a so as to freely turn according to fitting between an inner peripheral surface of a guide hole portion H and an outer peripheral surface of a guide convex portion 5b formed in the turning member 5a around a rotating axis line O which intersects the axis line W1 of the screw shaft W. Arc shaped holes 5c and 5c are formed in the turning member 5a. The turning member 5a is position fixed to the mounting member 4a by mounting bolts 5d and 5d via the arc shaped holes 5c and 5c. The pressure contacting roll R is arranged in the turning member 5a via the tape pressure contacting mechanism 4, the vertical oscillation mechanism 6 and the horizontal oscillation mechanism 7. The turning member 5a of the inclination mechanism 5 is regulated its turning in correspondence to the lead angle θ of the ball groove B. As a result, the rotating axis line R1 of the pressure contacting roll R is arranged so as to be inclined in correspondence to the lead angle θ of the ball groove B.

Further, in this case, the vertical oscillation mechanism 6 and the horizontal oscillation mechanism 7 are structured as shown in FIGS. 4, 5, 6, 7, 8, 9 and 10. More specifically, in the vertical oscillation mechanism 6 and the horizontal oscillation mechanism 7, a vertical eccentric mechanism 6*a* and a horizontal eccentric mechanism 7*a* are used. A vertical eccentric table 6*c* is arranged in the turning member 5*a* by sliding portions 6*b*, 6*b*, 6*b* and 6*b* so as to linearly oscillate freely in a vertical direction of the tangential direction of the ball groove B while being orthogonal to the rotating axis line R1 of the pressure contacting roll R. The pressure contacting base body 4*b* is slidably arranged in the vertical eccentric table 6*c* by sliding portions 7*b*, 7*b*, 7*b* and 7*b* so as to linearly oscillate in a direction of the rotating axis line R1 of the pressure contacting roll R toward both the inner side surfaces B1 and B1 of the ball groove B. A fitting hole 5*e* is formed in a guide convex portion 5*b* of the turning member 5*a*, a linearly oscillating motor M is fitted to the fitting hole 5*e*. The linearly oscillating motor M is mounted to the turning member 5*a* by a bolt 5*f*. A coupling shaft S is rotatably supported to the turning member 5*a* by a bearing 5*g* around the rotating axis line O. A main shaft M1 of the linearly oscillating motor M is fitted to an inner hole S1 of the coupling shaft S and is mounted by a bolt S2. An eccentric shaft portion 6*d* having an eccentric axis line O1 with an eccentricity amount E in relation to the rotating axis line O of the main shaft M1 is formed in the coupling shaft S. An eccentric wheel Se having a ball bearing form is rotatably provided in the eccentric shaft portion 6*d*. A vertical piece member 6*g* having a groove-like steel form as a whole is provided in the vertical eccentric table Sc. A pair of opposed contact surfaces 6*f* and 6*f* with which the eccentric wheel Se comes into contact are formed in an inner surface of a flange-shaped portion of the vertical piece member 6*g*. Further, an eccentric shaft portion 7*c* having an eccentric axis line O2 with an eccentricity amount ε in relation to the rotating axis line O of the main shaft M1 is formed in the coupling shaft S. An eccentric wheel 7*d* having a ball bearing form is rotatably provided in the eccentric shaft portion 7*c*. A horizontal piece member 7*f* having a groove-like steel form as a whole is provided in the pressure contacting base body 4*b*. A pair of opposed contact surfaces 7*e* and 7*e* with which the eccentric wheel 7*d* comes into contact are formed in an inner surface of the flange-like portion of the horizontal piece member 7*f*. The pressure contacting roll R is linearly oscillated Y in the direction of the rotating axis line R1 by the eccentric shaft portion 6*d* of the vertical oscillation mechanism 6, the eccentric wheel 6*e*, the contact surfaces 6*f* and 6*f* of the vertical piece member 6*g* and the sliding portions 6*b*, 6*b*, 6*b* and 6*b* on the basis of the driving of the linearly oscillating motor M. Further, the pressure contacting roll R is linearly oscillated X in the radial direction toward both the sinner side surfaces B1 and B1 of the ball groove B while being orthogonal to the direction of the rotating axis line R1 by the eccentric shaft portion 7*c* of the horizontal oscillation mechanism 7, the eccentric wheel 7*d*, the contact surfaces 7*e* and 7*e* of the horizontal piece member 7*f* and the sliding portions 7*b*, 7*b*, 7*b* and 7*b* on the basis of the driving of the linearly oscillating motor M. In other words, the pressure contacting roll R is linearly oscillated Y in the direction of the rotating axis line R1 by one linearly oscillating motor M, and the coupling shaft S in which two eccentric shaft portions 6*d* and 7*d* including the eccentric shaft portion 6*d* of the vertical eccentric mechanism 6*a* and the eccentric shaft portion 7*c* of the horizontal eccentric mechanism 7*a* are formed, and which has the inner hole S1 capable of fitting to the main shaft M1.

Further, the pressure contacting roll R is linearly oscillated X in the radial direction toward both the inner side surfaces B1 and B1 of the ball groove B while being orthogonal to the direction of the rotating axis line R1. As a result, the structures of the vertical oscillation mechanism 6 and the horizontal oscillation mechanism are simplified.

Figure 3:
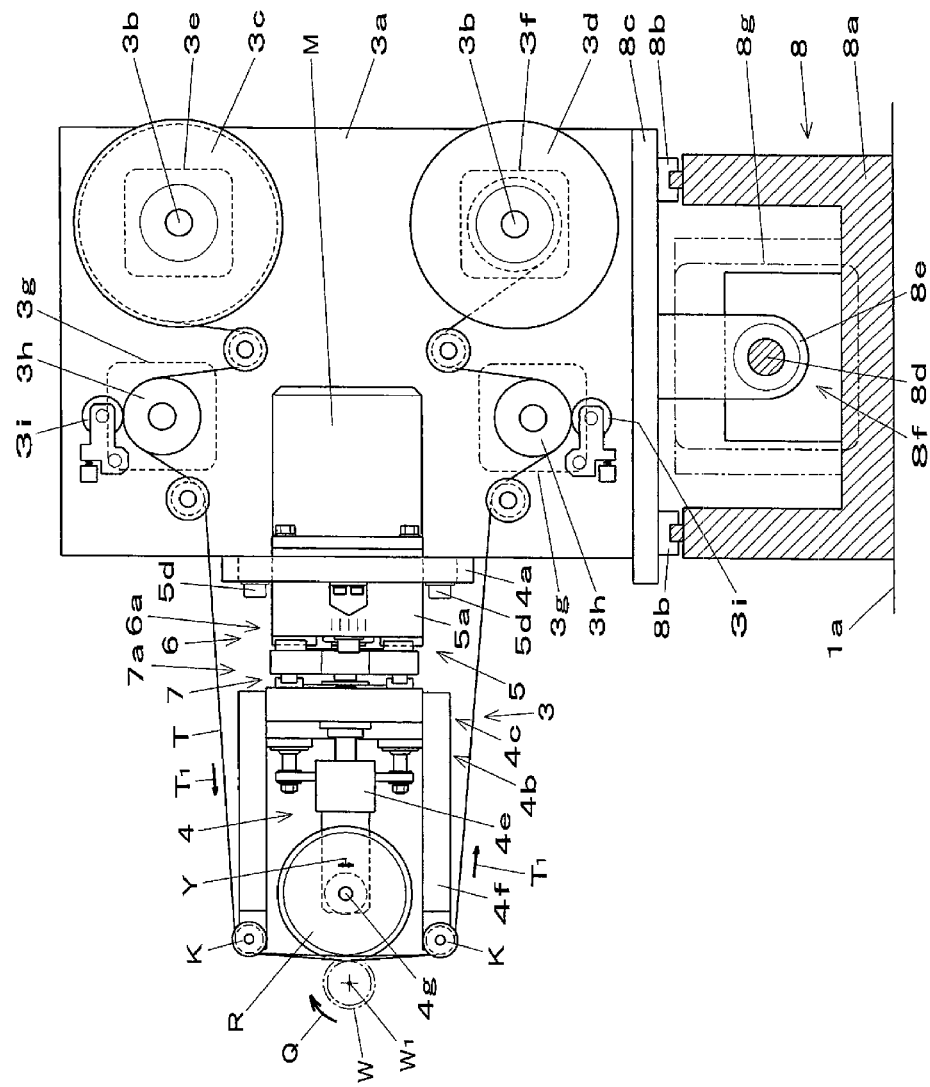
FIG. 3 is a side cross sectional view of a whole of the embodiment according to the present invention.

Further, the tape moving mechanism 8 is structured as shown in FIGS. 1, 2 and 3. More specifically, in the tape moving mechanism 8, a moving base table 8*a* is arranged in the machine body 1*a*. A sliding table 8*c* is arranged in the moving base table 8*a* by a sliding portion 8*b* so as to be movable in the direction of the axis line W1 of the screw shaft W. The mounting base table 3*a* of the tape transfer mechanism 3 is arranged in the sliding table 8*c*. Further, the tape moving mechanism 8 is adapted to move the polishing tape T in the direction of the axis line W1 of the screw shaft W via the sliding table 8*c* by a ball screw mechanism 8*f* constructed by a screw shaft 8*d* and a nut 8*e*, and a moving control motor 8*g*.

Further, the speed synchronizing means 9 is constructed by the rotating control motor 2*a* which rotates the screw shaft W, the moving control motor 8*g* which moves the polishing tape T, and a synchronous control part 9*a* which synchronously controls the rotating speed Q of the rotating control motor 2*a* and the rotating speed of the moving control motor 8*g*. The synchronous control part 9*a* employs, for example, a personal computer although specific circuit structures are omitted. The synchronous control part 9*a* is structured such as to synchronize the rotating speed Q of the screw shaft W and the moving speed F of the polishing tape T in correspondence to the lead L of the ball groove B.

The embodiment is structured as mentioned above. Accordingly, as shown in FIGS. 1, 2, 4, 6, 12, 13 and 14, the screw shaft W of the ball screw is rotatably retained by the retention mechanism 1. The screw shaft W is rotated around the axis line W1 by the rotary mechanism 2. The polishing tape T is transferred T1 continuously or intermittently by the tape transfer mechanism 4. The polishing tape T is brought into pressure contact with the screw shaft B on the outer peripheral surface of the pressure contacting roll R by the tape pressure contacting mechanism 4. The rotating axis line R1 of the pressure contacting roll R is arranged by the inclination mechanism 5 so as to incline in correspondence to the lead angle θ of the ball groove B. The polishing tape T is transferred and guided in the tangential direction of the pressure contacting roll R by the turnback rolls K and K. The pressure contacting roll R is linearly oscillated Y by the vertical oscillation mechanism 6 in the tangential direction of the ball groove B while being orthogonal to the rotating axis line R1 of the pressure contacting roll. Further, the pressure contacting roll R is linearly oscillated X by the horizontal oscillation mechanism 7 in the direction of the rotating axis line R1 toward both the inner side surfaces B1 and B1 of the ball groove B. In this case, a relationship of the respective linear oscillating motions Y and X is specifically set to Y>X in which Y=2 mm (E=1 mm) and X=0.2 mm (E=0.1 mm). The polishing tape T is moved by the tape moving mechanism 8 in the direction of the axis line W1 of the screw shaft W. The rotating speed Q of the screw shaft W and the moving speed F of the polishing tape T are synchronized by the speed synchronizing means 9 in correspondence to the lead L of the ball groove B. The ball groove B can be polished by the polishing tape T on the basis of the complex motion of the rotation of the screw shaft W, the transfer T1 of the polishing tape T, the linear oscillating motions Y and X in two directions including the tangential direction of the ball groove B and the direction of the rotating axis line R1 toward both the inner side surfaces B1 and B1 of the ball groove B, and the movement of the polishing tape T in synchronization with the rotating speed Q of the screw shaft W. The polishing tape T is moved in conformity to the lead L of the ball groove B on the basis of the movement of the polishing tape T in synchronization with the rotating speed Q of the screw shaft W, and the polishing tape T is securely brought into pressure contact with the ball groove B by the tape pressure contacting mechanism 4. The ball groove B can be securely polished by the polishing tape T on the basis of the continuous or intermittent transfer T1 of the polishing tape T and the linear oscillating motions Y and X in two directions including the tangential direction and the direction of the rotating axis line R1 toward both the inner side surfaces B1 and B1 of the ball groove B. It is possible to improve a polishing precision, it is possible to improve a surface roughness of the ball groove B and it is possible to improve a polishing workability of the ball groove B.

Further, in this case, the vertical oscillation mechanism 6 mentioned above is constructed by the vertical eccentric mechanism 6a which linearly oscillates Y the pressure contacting roll R in the tangential direction of the ball groove B while being orthogonal to the rotating axis line R1. As a result, it is possible to simplify the structure. Further, in this case, the horizontal oscillation mechanism 7 mentioned above is constructed by the horizontal eccentric mechanism 7a which linearly oscillates X the pressure contacting roll R in the direction of the rotating axis line R1 toward both the inner side surfaces B1 and B1 of the ball groove B. As a result, it is possible to simplify the structure. Further, in this case, the speed synchronizing means 9 mentioned above is constructed by the rotating control motor 2a which rotates the screw shaft W, the moving control motor 8g which moves the polishing tape T, and the synchronous control part 9a which synchronously controls the rotating speed Q of the rotating control motor 2a and the rotating speed of the moving control motor 8g. As a result, it is possible to synchronize the rotating speed Q of the screw shaft W and the moving speed F of the polishing tape T in correspondence to the lead L of the ball groove B, it is possible to securely move in a contact manner the polishing tape T in conformity to the lead L of the ball groove B, it is possible to simplify the structure and it is possible to improve the polishing precision.

The present invention is not limited to the embodiment mentioned above, but can be designed by appropriately changing the structures of the retention mechanism 1, the rotary mechanism 2, the tape transfer mechanism 3, the tape pressure contacting mechanism 4, the inclination mechanism 5, the vertical oscillation mechanism 6, the horizontal oscillation mechanism 7, the taper moving mechanism 8, the speed synchronizing means 9, the turnback rolls K and K and the pressure contacting roll R.

For example, the embodiment mentioned above employs a dry type polishing structure, however, may employ a so-called wet type polishing structure which supplies a processing liquid or a lubricant including loose grains or chemical agent made of various materials to a portion between the ball groove B of the screw shaft W and the polishing tape T. Further, the speed synchronizing means 9 may employ a mechanical synchronous rotary mechanism which is similar to a replacement gear mechanism employed in a lead screw mechanism of a lathe turning machine. In addition, the structure is designed by selecting according to the kind of the screw shaft W and the polishing condition.

The desired object can be sufficiently achieved as mentioned above.

DESCRIPTION OF REFERENCE NUMERALS

W screw shaft
W1 axis line
T polishing tape
T1 transfer
R pressure contacting roll
B ball groove
B1 inner side surface
R1 rotating axis line
L lead
θ lead angle
K turnback roll
Y linear oscillating motion
X linear oscillating motion
Q rotating speed
F moving speed
1 retention mechanism
2 rotary mechanism
2a rotating control motor
3 tape transfer mechanism
4 tape pressure contacting mechanism
5 inclination mechanism
6 vertical oscillation mechanism
6a vertical eccentric mechanism
7 horizontal oscillation mechanism
7a horizontal eccentric mechanism
8 tape moving mechanism
8g moving control motor
9 speed synchronizing means
9a synchronous control part

The invention claimed is:

1. A ball screw polishing method comprising the steps of:
rotatably retaining a screw shaft of a ball screw and rotating the screw shaft around an axis line when polishing the screw shaft by a polishing tape;
continuously or intermittently transferring the polishing tape;
bringing said polishing tape into pressure contact with a ball groove of said screw shaft on an outer peripheral surface of a pressure contacting roll;
wherein a rotating axis line of said pressure contacting roll is arranged so as to incline in correspondence to a lead angle of said ball groove,
wherein said polishing tape is transferred and guided in a tangential direction of the pressure contacting roll by a turnback roll,
linearly oscillating said pressure contacting roll in a tangential direction of the ball groove while being orthogonal to said rotating axis line;
linearly oscillating said pressure contacting roll in a direction of said rotating axis line toward both inner side surfaces of said ball groove;
moving said polishing tape to the direction of the axis line of said screw shaft;
synchronizing a rotating speed of said screw shaft and a moving speed of said polishing tape in correspondence to the lead of said ball groove; and
polishing said ball groove by said polishing tape on the basis of a complex motion of the rotation of said screw shaft, the transfer of said polishing tape, the linear oscillating motion in two directions including the tangential direction of the ball groove and said direction of the axis line toward both the inner side surfaces of said ball groove, and the movement of the polishing tape in synchronization with the rotating speed of said screw shaft.

2. A ball screw polishing device comprising:
a retention mechanism which rotatably retains a screw shaft of a ball screw;
a rotary mechanism which rotates said screw shaft around an axis line;
a tape transfer mechanism which continuously or intermittently transfer a polishing tape;
a taper pressure contacting mechanism which brings said polishing tape into pressure contact with a ball groove of said screw shaft on an outer peripheral surface of a pressure contacting roll;
an inclination mechanism which arranges a rotating axis line of said pressure contacting roll so as to incline in correspondence to a lead angle of said ball groove;
a tape moving mechanism which moves said polishing tape in a direction of an axis line of said screw shaft; and
a speed synchronizing means which synchronizes a rotating speed of said screw shaft and a moving speed of said polishing tape in correspondence to the lead of said ball groove,
wherein the ball screw polishing device further comprises:
a turnback roll which is capable of transferring and guiding the polishing tape in a tangential direction of the pressure contacting roll;
a vertical oscillation mechanism which linearly oscillates said pressure contacting roll in a tangential direction of the ball groove while being orthogonal to said rotating axis line; and
a horizontal oscillation mechanism which linearly oscillates said pressure contacting roll in a direction of aid rotating axis line toward both inner side surfaces of said ball groove.

3. The ball screw polishing device according to claim 2, wherein the vertical oscillation mechanism is constructed by a vertical eccentric mechanism which linearly oscillates the pressure contacting roll in the tangential direction of the ball groove while being orthogonal to said rotating axis line.

4. The ball screw polishing device according to claim 2, wherein the horizontal oscillation mechanism is constructed by a horizontal eccentric mechanism which linearly oscillates the pressure contacting roll in the direction of said rotating axis line toward both the inner side surfaces of the ball groove.

5. The ball screw polishing device according to claim 2, wherein the speed synchronizing means is constructed by a rotating control motor which rotates the screw shaft, a moving control motor which moves the polishing tape, and a synchronous control part which synchronously controls a rotating speed of said rotating control motor and a rotating speed of said moving control motor.

* * * * *